US012280987B2

(12) United States Patent
Pahlke et al.

(10) Patent No.: US 12,280,987 B2

(45) Date of Patent: Apr. 22, 2025

(54) DEVICE AND METHOD FOR MONITORING AN ELEVATOR SYSTEM

(71) Applicant: Otis Elevator Company, Farmington, CT (US)

(72) Inventors: Derk Oscar Pahlke, Berlin (DE); Tadeusz Pawel Witczak, Farmington, CT (US); Craig Drew Bogli, Avon, CT (US); Yrinee Michaelidis, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1468 days.

(21) Appl. No.: 16/702,047

(22) Filed: Dec. 3, 2019

(65) Prior Publication Data

US 2020/0172373 A1 Jun. 4, 2020

(30) Foreign Application Priority Data

Dec. 3, 2018 (EP) .................................... 18209794

(51) Int. Cl.

*B66B 5/00* (2006.01)
*B66B 1/34* (2006.01)
*B66B 13/02* (2006.01)

(52) U.S. Cl.

CPC .......... *B66B 5/0018* (2013.01); *B66B 1/3492* (2013.01); *B66B 13/02* (2013.01)

(58) Field of Classification Search

CPC ..... B66B 5/0018; B66B 1/3492; B66B 13/02; B66B 5/0037; B66B 13/14; B66B 5/0006; B66B 1/3407; B66B 5/0025

See application file for complete search history.

(56) References Cited

U.S. PATENT DOCUMENTS 7,434,666 B2 10/2008 Tyni et al.
9,463,952 B2 10/2016 Romnes (Continued)

FOREIGN PATENT DOCUMENTS

CN 103030042 B 12/2014
CN 104370175 A 2/2015

(Continued)

OTHER PUBLICATIONS

European Search Report for application EP 18209794.9, dated Sep. 23, 2019, 10 pages.

(Continued)

*Primary Examiner* — Jeffrey Donels

(74) *Attorney, Agent, or Firm* — CANTOR COLBURN LLP

(57) ABSTRACT

A method of calibrating a monitoring device (20) for monitoring movement of a movable component (2, 12, 19) of an elevator system (2) comprises detecting (120) a travel time ($\Delta t_k$) between a starting time ($t_k$) and a stopping time ($t'_k$) as well as acceleration ($a(t)$) of at least one movement of the movable component (2, 12, 19); determining (130, 140) a travel distance of the movable component (2, 12, 19) by integrating the detected acceleration ($a(t)$) twice with respect to the detected travel time ($\Delta t_k$); correlating (150) the determined travel distance ($s_k$) with the detected travel time ($\Delta t_k$) to form a pair of travel time and travel distance; and storing (160) the pair of travel time and travel distance ($\Delta t_k, s_k$) as part of a travel profile (34).

14 Claims, 5 Drawing Sheets

(56) References Cited

U.S. PATENT DOCUMENTS

| | | | | |
|---|---|---|---|---|
| 9,558,388 | B2 | 1/2017 | Schatt et al. | |
| 2004/0174161 | A1 | 9/2004 | Tausch et al. | |
| 2012/0181118 | A1 | 7/2012 | Choi et al. | |
| 2014/0174861 | A1 * | 6/2014 | Sarjanen | B66B 1/3407 187/387 |
| 2016/0304313 | A1 | 10/2016 | Kinnari et al. | |
| 2017/0349399 | A1 | 12/2017 | Sonnenmoser et al. | |
| 2018/0319622 | A1 * | 11/2018 | Herkel | B66B 5/0018 |
| 2021/0371233 | A1 * | 12/2021 | Kusserow | B66B 1/3492 |

FOREIGN PATENT DOCUMENTS

| | | | |
|---|---|---|---|
| CN | 104768862 | A | 7/2015 |
| EP | 2527281 | A2 | 11/2012 |
| EP | 2687471 | B1 | 9/2015 |
| EP | 3002245 | A2 | 4/2016 |
| EP | 3305704 | A1 | 4/2018 |
| JP | 2008179463 | A | 8/2008 |
| JP | 5289607 | B1 | 9/2013 |
| KR | 100976781 | B1 | 8/2010 |
| WO | 2009135629 | A1 | 11/2009 |
| WO | 2013030457 | A1 | 3/2013 |
| WO | 2019141598 | A1 | 7/2019 |

OTHER PUBLICATIONS

Chinese Office Action for Application No. 201911220141.3; Issued Aug. 24, 2021, 9 Pages.

* cited by examiner

| | $z'_0$ | $z'_1$ | $z'_2$ | $z'_3$ | $z'_4$ |
|---|---|---|---|---|---|
| $z_0$ | - | | | | $(\Delta t_2, s_2)$ |
| $z_1$ | $(\Delta t_6, s_6)$ | - | | | |
| $z_2$ | | $(\Delta t_5, s_5)$ | - | | |
| $z_3$ | $(\Delta t_1, s_1)$ | | $(\Delta t_4, s_4)$ | - | |
| $z_4$ | | | | $(\Delta t_3, s_3)$ | - |

35

FIG. 7

DEVICE AND METHOD FOR MONITORING AN ELEVATOR SYSTEM

FOREIGN PRIORY

This application claims priority to European Patent Application No. 18209794.9, filed Dec. 3, 2018, and all the benefits accruing therefrom under 35 U.S.C. § 119, the contents of which in its entirety are herein incorporated by reference.

BACKGROUND

The invention relates to a monitoring device and to a method of monitoring operation of an elevator system. The invention in particular relates to a method of calibrating such a monitoring device.

Elevator systems typically comprise at least one elevator car configured for moving along a hoistway extending between a plurality of landings located at different floors. Elevator systems further comprise an elevator drive configured for driving the elevator car. A monitoring device may be used for monitoring the movement of the elevator car within the hoistway. In order to facilitate the installation, such a monitoring device may be implemented as an autonomous monitoring device, i.e. as a monitoring device not connected to an external power supply but comprising its own power supply allowing autonomous operation of the monitoring device.

In order to prolong the lifetime of the power supply, it would be beneficial to provide an improved monitoring device with reduced power consumption.

BRIEF DESCRIPTION

According to an exemplary embodiment of the invention, a monitoring device for monitoring movement of a movable component of an elevator system, in particular the movement of an elevator car, comprises a travel sensor including an acceleration sensor and a controller. The acceleration sensor is configured for detecting acceleration of the movable component and providing a corresponding acceleration signal. The controller is configured for determining a travel time of the movable component between a starting time and a stopping time and generating a corresponding travel time signal, and for determining a travel distance of the moving component by integrating the detected acceleration twice with respect to the detected travel time. The controller is further configured for correlating the determined travel distance with the detected travel time forming pair of travel time and travel distance, and for storing the pair of travel time and travel distance as part of a travel profile in a memory.

Exemplary embodiments of the invention also include a monitoring device comprising a travel sensor and a controller. The travel sensor is configured for determining a travel time of the movable component between a starting time and a stopping time and providing a corresponding travel time signal. The controller is configured for receiving the travel time signal from the travel sensor, and for determining the travel distance of the movable component based on the travel time signal in combination with the travel profile.

According to an exemplary embodiment of the invention, a method of calibrating a monitoring device for monitoring movement of a movable component of an elevator system, in particular of an elevator car, comprises detecting a travel time between a starting time and a stopping time as well as acceleration of at least one movement of the movable component; determining a travel distance of the movable component by integrating the detected acceleration twice with respect to the detected travel time; correlating the determined travel distance with the detected travel time forming a pair of travel time and travel distance; and storing the pair of travel time and travel distance as part of a travel profile.

According to an exemplary embodiment of the invention, a method for monitoring movement of a movable component of an elevator system comprises determining that a movable component of an elevator car is moving; determining a travel time of the movable component; determining the travel distance of the movable component based on the determined travel time in combination with a travel profile, in particular a travel profile generated by a method of calibrating a monitoring device according to an exemplary embodiment of the invention as outlined before.

The travel distance may be specified in standard length units such as inch, feet, meters or centimeters. Based on the travel profile, the distance the elevator car has traveled also may be specified as the number of floors the elevator car has passed. Thus, in the context of the present invention, the term "travel distance" may refer to travel distances specified in standard length units as well as to travel distances specified by the number of floors the elevator car has passed.

Methods and devices for monitoring operation of an elevator system according to exemplary embodiments of the invention require calculating the travel distances of the movable component only during an initial calibration phase of the monitoring system for generating a travel profile of the respective elevator system. After the travel profile has been generated and stored in memory, the respective travel distances may be determined from detected travel times using the travel profile.

Thus, the power consuming integration of the detected accelerations with respect to time may be omitted after the calibration phase has been completed. In consequence, the power consumption of the monitoring device may be reduced, resulting in a longer lifetime of the power supply.

A number of optional features are set out in the following. These features may be realized in particular embodiments, alone or in combination with any of the other features, unless specified otherwise.

A method according to an exemplary embodiment of the invention may include determining a position of the movable component at the starting time and/or at the stopping time, and storing the determined position together with the pair of travel time and travel distance. The position of the movable component may be specified in standard length units such as inch, feet, meters or centimeters measured from a predefined position within the hoistway, such as the bottom or the top of the hoistway. Alternatively, the position of the movable component may be specified as the number of the floor at which the movable component is currently positioned.

Storing the determined position in addition to the pair of travel time and travel distance allows for an even more reliable determination of the current travel distance, as the travel distance may be correlated not only with the travel time but also with the starting position and/or with the stopping position of the movable component.

A method according to an exemplary embodiment of the invention may include moving the movable component between a plurality of pairs of floors of the elevator system and determining and storing the travel times and the distances for each of said pairs of floors. The method in particular may include moving the movable component between all possible pairs of floors of the elevator system and determining and storing the travel times and the distances for every pair of floors. Moving the movable component between all pairs of floors of the elevator system ensures that the travel profile comprises the travel times and travel distances for each possible pair of floors of the elevator system after the calibration has been completed.

A method according to an exemplary embodiment of the invention may include summing up the determined travel distances, with the sign of the travel distances indicating the direction of travel, over a plurality of movements of the movable component for determining the current position of the movable component.

Exemplary embodiments of the invention in particular may include a method of determining the current position of a movable component of the elevator system, wherein the method comprises determining a starting position of the movable component; determining a direction of movement of the movable component; determining a travel distance of the movable component employing a method according to an exemplary embodiment of the invention as outlined before, and determining a current position of the movable component by adding or subtracting the determined travel distance to/from the starting position. This may further include setting the current position of the movable component as a new starting position, after the movement of the movable component has been stopped.

The monitoring device in particular may include a direction sensor configured for detecting a travel direction of the movable component and providing a corresponding direction signal. The controller may be configured for determining a current position of the movable component by adding or subtracting the determined travel distance to/from the starting position depending on the respective direction signal. Alternatively, the travel direction of the movable component may be determined from the acceleration signals provided by the acceleration sensor.

This provides a reliable method of determining the current position of the movable component which may be implemented easily and at low costs.

A method according to an exemplary embodiment of the invention may include summing up the absolute values of the determined travel distances over a plurality of movements of the movable component for generating a total travel distance of the movable component. This provides a reliable method of determining the total travel distance of the movable component which may be implemented easily at low costs.

The total travel distance in particular may be used for implementing predictive maintenance, i.e. for scheduling the next maintenance of the elevator system based on the actual operation of the elevator system, in particular based on the determined total travel distance of the movable component. Predictive maintenance allows reducing the efforts and costs for maintenance without deteriorating the safety and reliability of the elevator system.

The movable component in particular may be an elevator car, a counterweight moving concurrently with the elevator car, a sheave or a shaft of a motor used for driving the elevator car, or an elevator door, such as an elevator car door, in particular a pane of an elevator car door. The detected movements may include vertical, horizontal and/or rotational movements of the movable component.

Elevator systems include elevator safety systems preventing elevator cars from moving as long as an elevator car door is open. Thus, detecting movements of an elevator car door and determining the current position of the elevator car door(s) allows setting the determined velocity of the elevator car to zero when at least one elevator car door is determined to be open. Setting the determined velocity of the elevator car to zero in case an elevator car door is open allows enhancing the reliability and the accuracy of the calibration since offset errors, which may result from an erroneous or inaccurate detection of the acceleration and/or integration of the detected acceleration, are corrected.

DRAWING DESCRIPTION

An exemplary embodiment of the invention is described in the following in more detail with reference to the enclosed figures.

FIG. 1 schematically depicts an elevator system with a monitoring device according to an exemplary embodiment of the invention.

FIG. 7 depicts a travel time profile according to an exemplary embodiment of the invention.

DETAILED DESCRIPTION

Figure 1:
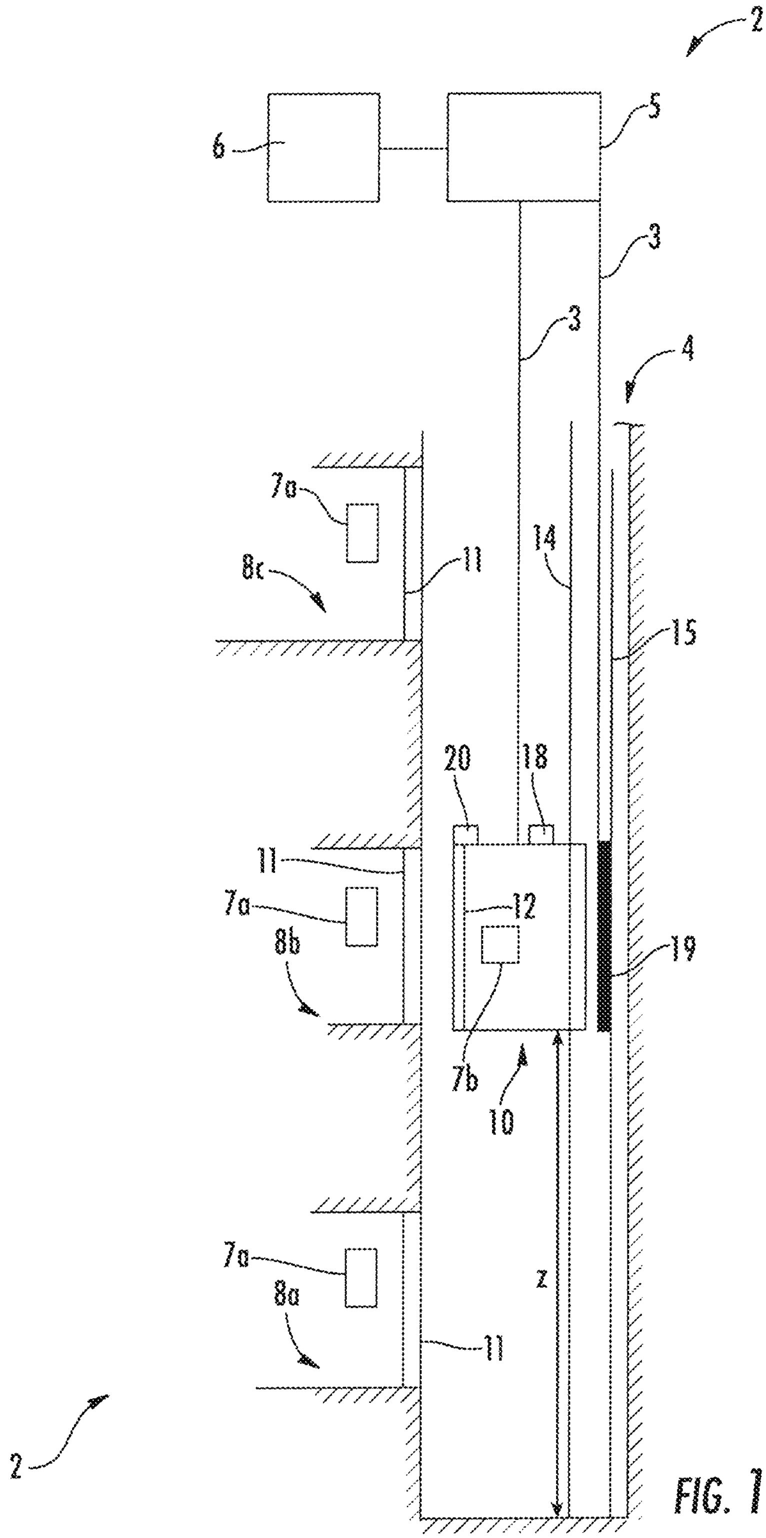

FIG. 1 schematically depicts an elevator system 2 with a monitoring device 20 according to an exemplary embodiment of the invention.

The elevator system 2 includes an elevator car 10 movably arranged within a hoistway 4 extending between a plurality of landings located at different floors 8*a*, 8*b*, 8*c*. The elevator car 10 in particular is movable along a plurality of car guide members 14, such as guide rails, extending along the vertical direction of the hoistway 4. Only one of said car guide members 14 is visible in FIG. 1.

Although only a single elevator car 10 is depicted in FIG. 1, the skilled person understands that exemplary embodiments of the invention may include elevator systems 2 comprising a plurality of elevator cars 10 moving in one or more hoistways 4.

The elevator car 10 is movably suspended by means of a tension member 3. The tension member 3, for example a rope or belt, is connected to an elevator drive 5, which is configured for driving the tension member 3 in order to move the elevator car 10 along the height of the hoistway 4 between the plurality of floors 8*a*, 8*b*, 8*c*.

Each landing is provided with a landing door 11, and the elevator car 10 is provided with a corresponding elevator car door 12 for allowing passengers to transfer between a landing and the interior of the elevator car 10 when the elevator car 10 is positioned at one of the floors 8*a*, 8*b*, 8*c*.

The exemplary embodiment of the elevator system 2 shown in FIG. 1 employs a 1:1 roping for suspending the elevator car 10. The skilled person, however, easily understands that the type of the roping is not essential for the invention and that different kinds of roping, e.g. a 2:1 roping, may be used as well.

The tension member 3 may be a rope, e.g. a steel wire rope, or a belt. The tension member 3 may be uncoated or may have a coating, e.g. in the form of a polymer jacket. In a particular embodiment, the tension member 3 may be a belt comprising a plurality of polymer coated steel cords (not shown). The elevator system 2 may have a traction drive including a traction sheave for driving the tension member 3.

The elevator system 2 may use a tension member 3, as it is shown in FIG. 1, or it may be an elevator system without a tension member 3. The elevator drive 5 may be any form of drive used in the art, e.g. a traction drive, a hydraulic drive or a linear drive (not shown).

The elevator system 2 may have a machine room or may be a machine room-less elevator system.

The elevator system 2 shown in FIG. 1 further includes a counterweight 19 attached to the tension member 3 opposite to the elevator car 10 for moving concurrently and in opposite direction with respect to the elevator car 10 along at least one counterweight guide member 15. The skilled person understands that the invention may be applied also to elevator systems 2 which do not comprise a counterweight 19.

The elevator drive 5 is controlled by an elevator control 6 for moving the elevator car 10 along the hoistway 4 between the different floors 8*a*, 8*b*, 8*c*.

Input to the elevator control 6 may be provided via landing control panels 7*a*, which are provided on each floor 8*a*, 8*b*, 8*c* in the vicinity the landing doors 11, and/or via an elevator car control panel 7*b* provided inside the elevator car 10.

The landing control panels 7*a* and the elevator car control panel 7*b* may be connected to the elevator control 6 by means of electric wires, which are not shown in FIG. 1, in particular by an electric bus, such as a field bus/CAN-bus, or by means of wireless data connections.

The elevator car 10 depicted in FIG. 1 is equipped with a sensor device 18, which for example may include a position sensor and/or a speed sensor configured for detecting the position and/or the speed of the elevator car 10, respectively. In one embodiment, the sensor device 18 may be located at any desired position in the hoistway 4 or on the elevator equipment. The sensor device 18 is an optional feature, which is not essential for the invention.

The sensor device 18 may be configured for wireless data transmission in order to allow transmitting data from the sensor device 18 to the elevator control 6 without providing a wire connection between the sensor device 18 and the elevator control 6.

The elevator system 2 further comprises a monitoring device 20 configured for monitoring the movement of the elevator car 10.

The monitoring device 20 may be affixed to the elevator car 10, as depicted in FIG. 1. The monitoring device 20 may be affixed at any desired position on the elevator car 10 including the top (ceiling), the bottom and the sidewalls of the elevator car 10. The monitoring device 20 in particular may be mounted to the elevator car door 12 or other parts of the elevator car door system, such as the door hanger, door movement components or door tracks, in order to allow detecting movements of the elevator car door 12.

Alternatively, the monitoring device 20 may be affixed to a component of the elevator system 2 moving concurrently with the elevator car 10. For example, the moving may be affixed to a traction sheave (not shown) of the elevator drive 5 or to a counterweight 19 (if present).

Figure 2:
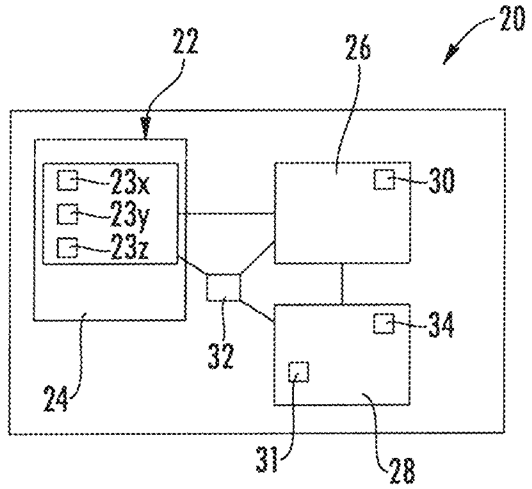
FIG. 2 is a schematic illustration of a monitoring device according to an exemplary embodiment of the invention.

FIG. 2 is a schematic illustration of a monitoring device 20 according to an exemplary embodiment of the invention.

The monitoring device 20 comprises a travel sensor 24. The travel sensor 24 is configured for detecting a travel time $\Delta t_k$ of the monitoring device 20 between a starting time $t_k$ and a stopping time $t'_k$, i.e. the time the monitoring device 20 is moving, and for providing a corresponding travel time signal. Optionally, the travel sensor 24 further may be configured for detecting the direction of the movement.

The travel sensor 24 in particular includes an acceleration sensor 22 configured for detecting acceleration of the monitoring device 20 and for providing a corresponding acceleration signal.

The acceleration sensor 22 includes at least one accelerometer 23*x*, 23*y*, 23*z*. Each accelerometer 23*x*, 23*y*, 23*z* is configured for detecting accelerations along an x-axis, a y-axis, and a z-axis, respectively. The acceleration sensor 22 may also include at least one accelerometer (not shown) configured for detecting accelerations along a direction which is inclined with respect to the x-axis, the y-axis, and/or the z-axis, respectively.

The monitoring device 20 also comprises a controller 26 and a memory 28. The memory 28 may be integrated with the controller 26, or it may be provided separately from the controller 26, as depicted in FIG. 2.

The controller 26 may include a microprocessor 30 configured for executing an appropriate software program in order to carry out the desired tasks. Alternatively or additionally, the controller 26 may comprise hardware circuitry 31, in particular at least one application-specific integrated circuit (ASIC) or a field programmable gate array circuit (FPGA), configured for providing the desired functionalities.

In one exemplary embodiment, which is not shown in the figures, the controller 26 may be located elsewhere at the elevator system 2. The controller 26 in particular may be integrated with the elevator controller 6. Alternatively, the controller 26 may be provided separately from the elevator controller 6. In one embodiment, the controller 26 may be remotely located and/or in a virtual cloud. In one embodiment, the controller 26 may be collocated with the travel sensor 24.

The monitoring device 20 further comprises a power supply 32 configured for providing the electrical energy needed for operation the monitoring device 20. The power supply 32 may include a battery and/or an energy harvesting device.

Operation of a monitoring device 20 according to an exemplary embodiment of the invention is exemplarily described in the following with reference to FIGS. 3 to 7.

Figure 3:
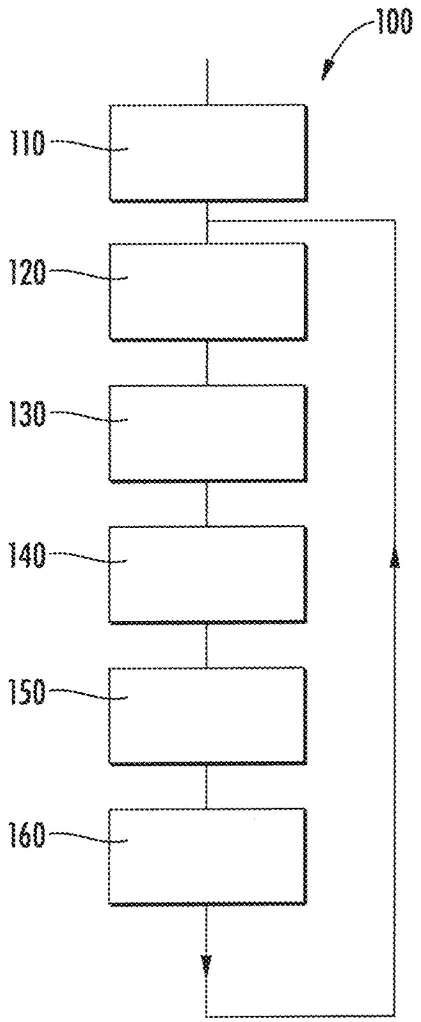
FIG. 3 is a flow diagram visualizing a method of calibrating a monitoring device according to an exemplary embodiment of the invention.

FIG. 3 is a flow diagram visualizing a method of calibrating the monitoring device 20 (calibration 100) according to an exemplary embodiment of the invention.

Figure 4:
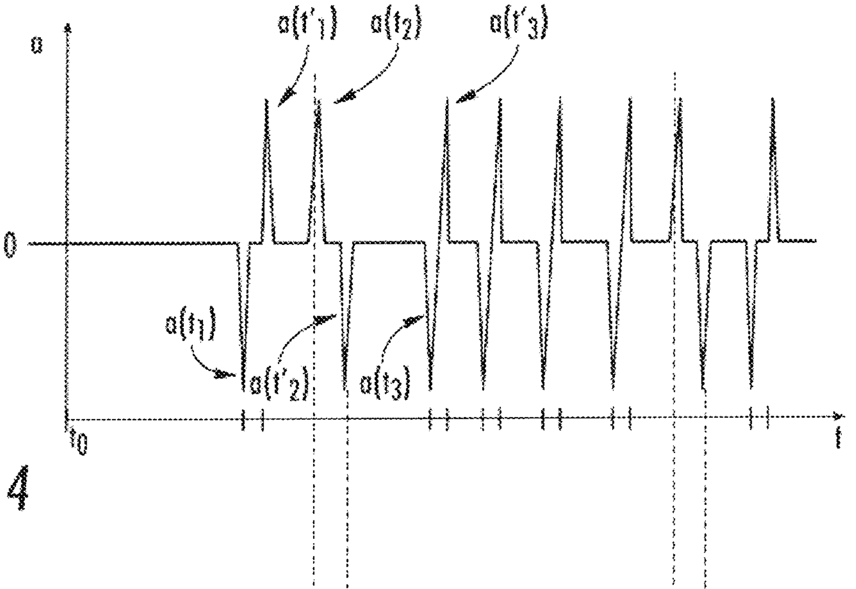
FIG. 4 depicts the acceleration an elevator car as a function of time for an exemplary movement of the elevator car.
Figure 5:
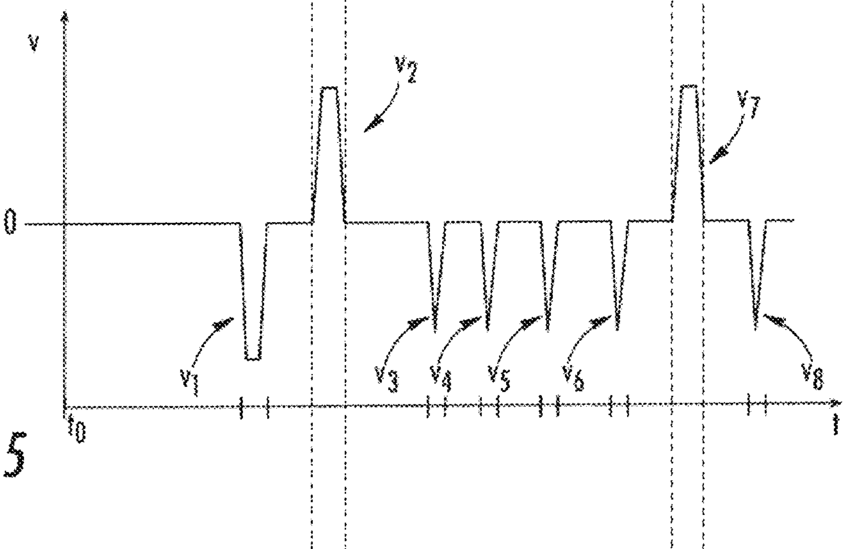
FIG. 5 depicts the velocity of the elevator car as a function of time.
Figure 6:
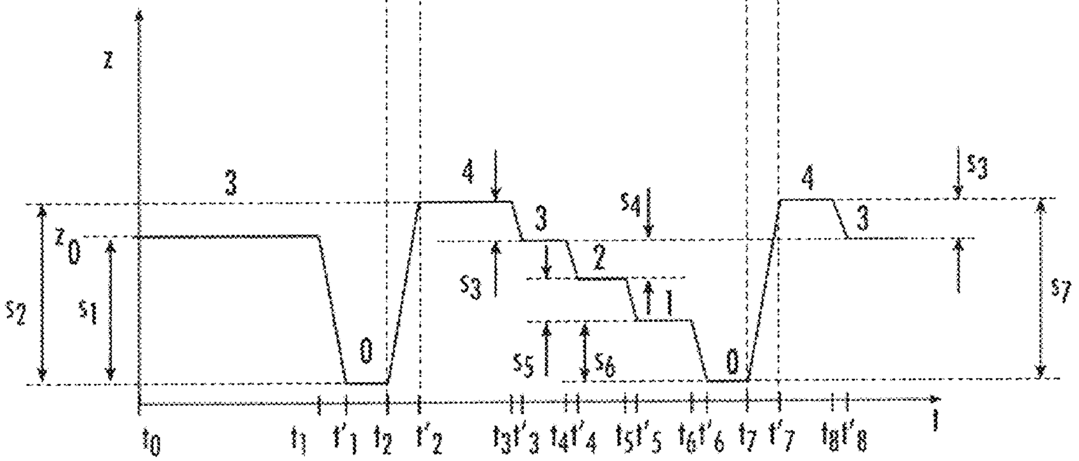
FIG. 6 depicts the position the elevator car as a function of time.

FIG. 4 to 6 are graphs illustrating exemplary movements of a movable component 10, 12, 19 of the elevator system 2.

For the following description, the movable component 10, 12, 19 is considered to be the elevator car 10. The skilled person, however, understands that the movable component 10, 12, 19 also may be the elevator car door 12 or the counterweight 19, or any other component moving concurrently with the elevator car 10.

In the graph depicted in FIG. 4, the acceleration a(t) of the elevator car 10 is plotted on the vertical axis as a function of time t (horizontal axis). In the graph depicted in FIG. 5, the corresponding velocity v(t) of the elevator car 10 is plotted on the vertical axis as a function of time t, and in the graph depicted in FIG. 6, the position (height) z(t) of the elevator car 10 within the hoistway 4 (cf. FIG. 1) is plotted on the vertical axis as a function of time t.

At the beginning ($t=t_0$), the elevator car 10 is not moving (v(to)=0) but stationary located at a starting position $z_0$ within the hoistway 4, in particular at a floor 8*a*, 8*b*, 8*c* corresponding to the third floor, which is indicated by the number "3" in FIG. 6.

In a first step 110, the starting position $z_0$ of the elevator car 10 is determined, e.g. using an absolute position sensor comprised within sensor device 18 or from a manual input indicating the current position $z_k$ of the elevator car 10.

At a time $t_1>t_0$, the elevator car 10 starts moving. In the example depicted in FIGS. 4 to 6, the elevator car 10 in particular is accelerated with a negative acceleration $a(t_1)<0$ (see FIG. 4) causing a downward movement of the elevator car 10. At a time $t'_1>t_1$, the downward movement of the elevator car 10 is stopped by a counteracting (positive) acceleration $a(t'_1)>0$.

At a later time $t_2>t'_1$, the elevator car 10 starts moving again. This time, the elevator car 10 in particular is accelerated with a positive acceleration $a(t_2)>0$ (see FIG. 4) causing an upward movement of the elevator car 10. At time $t'_2>t_2$ the upward movement of the elevator car 10 is stopped by a counteracting (negative) acceleration $a(t'_2)<0$.

Similar pairs of accelerations ($a(t_k)$, $a(t'_k)$) follow at later times ($t_k$, $t'_k$) with k being an integer between and including 3 and 8.

The accelerations ($a(t_k)$, $a(t'_k)$) of the elevator car 10 are detected as a function of time t by the acceleration sensor 22 of the monitoring device 20 in step 120 (see FIG. 3) and integrated with respect to time by the controller 26 in step 130 for providing the velocity v(t) of the elevator car 10 as a function of time t. Said velocity v(t) is plotted in FIG. 5.

FIG. 5 shows that each pair of accelerations ($a(t_k)$, $a(t'_k)$) assigned to the same movement results in a corresponding peak $v_k$ of the velocity v(t), each peak $v_k$ corresponds to a movement of the elevator car 10 between two adjacent stops.

Integrating the velocity v(t) with respect to time in step 140 (see FIG. 3) results in a position function z(t) indicating the current position (height) z of the elevator car 10 within the hoistway 4. Said position function z(t) is plotted as function of time t in FIG. 5. Each plateau within the plot of the position function z(t) correspond to a stop of the elevator car 10 at one of the floors 8*a*, 8*b*, 8*c*. The respective floor 8*a*, 8*b*, 8*c* is indicated by the number shown next to the plateau.

In the example depicted in FIGS. 4 to 6, the elevator car 10 moves: (1) from the 3rd floor to the 0th floor (ground floor) over a travel distance $s_1$ in a first movement (k=1); (2) from the 0th floor (ground floor) to the 4th floor over a travel distance $s_2$ in a second movement (k=2); (3) from the 4th floor to the 3rd floor over a travel distance $s_3$ in a third movement (k=3); (4) from the 3rd floor to the 2nd floor over a travel distance $s_4$ in a fourth movement (k=4); (5) from the 2nd floor to the 1st floor over a travel distance $s_5$ in a fifth movement (k=5); (6) from the 1st floor to the 0th floor (ground floor) over a travel distance $s_6$ in a fifth movement (k=6); (7) from the 0th floor (ground floor) to the 4th floor over a travel distance $s_7$ in a seventh movement (k=7); and (8) from the 4th floor to the 3rd floor over a travel distance $s_5$ in an eighth movement (k=8).

The travel distance $s_k$ the elevator car 10 has moved in the course of each movement may be determined from said positional function z(t). In particular, the travel distance $s_k$ of the elevator car 10 in the course of the k-th movement is $$s_k=z(t'_k)-z(t_k).$$

When the elevator car 10 starts from a known starting position $z_0$, the current position $z(t'_k)$ (cf. FIG. 6) may be calculated by $$z(t'_k)=z_0+s_1+s_2+ \ldots +s_k$$

with $s_k$ being negative or positive depending on whether the elevator car 10 is moving upwards or downwards during the respective movement.

The absolute values $|s_k|$ of the travel distance $s_k$ may be summed up for to calculating the total travel distance $s_{total}(t'_k)$ of the elevator car 10.

$$s_{total}(t'_k)=|s_1|+|s_2|+ \ldots +|s_k|$$

Said total travel distance $s_{total}$ may be used for determining whether the elevator system 2 needs maintenance. The total travel distance $s_{total}$ in particular may be used for predictive maintenance, i.e. for scheduling the next maintenance of the elevator system 2. Predictive maintenance allows reducing the efforts and costs for maintenance without deteriorating the safety and reliability of the elevator system 2.

The travel distances $s_k$ may be specified in standard length units such as inch, feet, meters or centimeters. Optionally, the travel distance $s_k$ calculated by integrating the acceleration a(t) with respect to the detected travel time $\Delta t_k$ may be converted into the number of floors 8*a*, 8*b*, 8*c* over which the elevator car 10 has traveled, and each detected travel time $\Delta t_k=t'_k-t_k$ may be correlated with the number of floors 8 over which the elevator car 10 has traveled during the detected travel time $\Delta t_k$.

In the exemplary embodiment described before, the starting position $z_0$ of the elevator car 10 at the beginning of the calibration 100 is considered to be known, e.g. from an absolute position sensor comprised in the sensor device 18, or from a manual input indicating the current position of the elevator car 10 at to.

In an alternative embodiment, the starting position $z_0$ of the elevator car 10 at to is not known. Instead, the starting position $z_0$ of the elevator car 10 is set to an arbitrary value, e.g. to a value corresponding to the lowest floor 8*a*, and the calibration 100 of the monitoring device 20 is started and performed as it has been described before.

In case, however, the monitoring device 20 detects a movement, which moves the elevator car 10 below the previously set starting position $z_0$, it recognizes that the previously set starting position $z_0$ does not correspond to the lowest floor 8*a*, and the newly determined lowest position of the elevator car 10 is set as the new lowest floor 8*a*.

This procedure is repeated in case the elevator car 10 is moved to an even lower floor 8*a*, 8*b*, 8*c* in the following. In consequence, after the calibration 100 has been finalized, i.e. after the elevator car 10 has been moved to every floor 8*a*, 8*b*, 8*c* of the elevator system 2 at least once, the lowest floor 8*a* is set correctly. This allows determining the current position z(t) of the elevator car 10 within the hoistway 4 by integrating the detected accelerations a(t) twice with respect to time t, as it has been described before.

The skilled person understands that a method according to an exemplary embodiment of the invention similarly may be employed by setting the initial starting position $z_0$ to a position corresponding to the highest floor 8*c* and updating the position of the highest floor 8*c* in case the elevator car 10 is moved to a position above the previously set "highest floor".

As another optional feature, which may be employed independently or in combination with the previously described determination of the starting position $z_0$, the position of at least one door 12 of the elevator car 10 (elevator car door 12) may be determined. The position of at least one elevator car door 12 in particular may be determined by detecting and integrating (horizontal) accelerations of at least one panel of the at least one elevator car door 12.

As the elevator car 10 is not allowed to move when at least one elevator car door 12 is open, the information about the current position of the at least one elevator car door 12 may be used for correcting the velocity information determined by integrating the detected acceleration a(t). The velocity v(t) of the elevator car 10 in the vertical direction in particular may be set to zero any time the at least one elevator car door 12 is determined as being open, i.e. as not being completely closed. This enhances the reliability and accuracy of the results as it eliminates offset errors which may occur when the velocity v(t) and the position z(t) of the elevator car 10 are calculated by integrating a detected acceleration a(t).

As performing numerical integration is elaborate, considerable computing power is needed for integrating the detected acceleration a(t) twice with respect to time t in steps 130 and 140 (cf. FIG. 3). Thus, a relatively large amount of electrical energy is consumed for providing the necessary computing power. This in particular is disadvantageous in case the monitoring device 20 is operated as an autonomous monitoring device 20, i.e. as a monitoring device 20 not connected to an external power supply but comprising its own power supply 32, for example in form of a battery.

In such an autonomous monitoring device 20, repeatedly calculating the travel distances $s_k$ of the elevator car 10 by integration, as it has been described before, results in an undesirably short lifetime of such a local power supply 32.

For reducing the power consumption of the monitoring device 20, according to an exemplary embodiment of the invention, the travel distances $s_k$ are calculated by means of integration, as it has been described before, only during the initial calibration 100 of the monitoring device 20.

After each movement has been completed, i.e. after the elevator car 10 has been stopped, the calculated travel distance $s_k$ is correlated in a further step 150 (see FIG. 4) with the detected travel time $\Delta t_k = t'_k - t_k$ of the respective movement forming a pair of travel time and travel distance $(\Delta t_k, s_k)$, and said pair of travel time and travel distance $(\Delta t_k, s_k)$ is stored in the memory 180 in a next step 160.

As a result, a travel time profile 34 is build-up during the calibration 100. The travel time profile 34 basically comprises a two-dimensional matrix 35, as it is exemplarily depicted in FIG. 7, with an entry including a pair of travel time and travel distance $(\Delta t_k, s_k)$ for each combination of starting positions z (rows) and stopping positions z' (columns) of the elevator car 10. The travel time profile 34 depicted in FIG. 7 is not yet completed but comprises only entries, i.e. pairs of travel time and travel distance $(\Delta t_k, s_k)$, corresponding to the movements of the elevator car 10 illustrated in FIGS. 4 to 6.

The calibration 100 of the monitoring device 20 in particular is continued until the elevator car 10 has traveled at least once between each pair of potential destinations, in particular between each pair of floors 8*a*, 8*b*, 8*c*, thereby populating the matrix 35 of the travel time profile 34 except for its diagonal by generating and storing a pair of travel time and travel distance $(\Delta t_k, s_k)$ for each pair of floors 8*a*, 8*b*, 8*c*.

It is noted that in the example depicted in FIGS. 4 to 6, the seventh movement corresponds to the second movement $(s_2 = s_7)$, and that the eighth movement corresponds to the third movement $(s_3 = s_8)$, respectively. Thus, the seventh and eighth movements do not provide a new pair of travel time and travel distance $(\Delta t_k, s_k)$, respectively.

Multiply determination of the travel times $\Delta t_k$ and travel distances $s_k$ associated with the same pair of floors 8*a*, 8*b*, 8*c*, however, may be beneficial for checking the respective previously determined pair of travel time and travel distance $(\Delta t_k, s_k)$, and/or for enhancing the reliability and accuracy of the travel profile 34 by calculating and storing the arithmetic averages of multiple results determined for multiple movements between the same floors 8*a*, 8*b*, 8*c*.

Alternatively, in order to reduce the power consumption, the integration of the detected acceleration a(t) may be omitted in case a pair of travel time and travel distance $(\Delta t_k, s_k)$ is already known for the respective travel.

After the calibration 100 has been completed, the elaborate integration of the detected acceleration a(t), which needs a large amount of electrical energy, is not necessary anymore, but may be deactivated for reducing the power consumed by the monitoring device 20.

The detected travel times $\Delta t_k$ also may be associated with starting floors 8*a*, 8*b*, 8*c* and stopping floors 8*a*, 8*b*, 8*c* of the elevator car 10, as they are represented by the rows and columns of the matrix 35, respectively.

Figure 8:
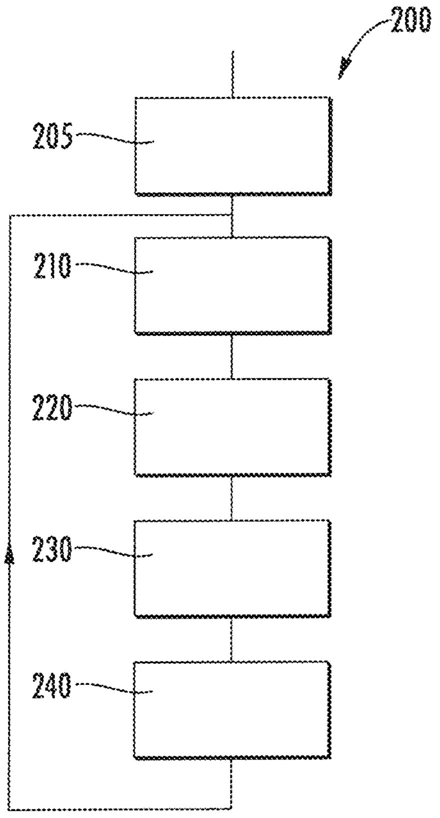
FIG. 8 depicts a flow diagram of method of operating a monitoring device according to an exemplary embodiment of the invention after the calibration has been completed.

FIG. 8 depicts a flow diagram visualizing the operation 200 of a monitoring device 20 according to an exemplary embodiment of the invention after the calibration 100 has been completed.

Optionally, in an initial step 205, an initial starting position $z_0$ of the elevator car 10 is set, e.g. from an absolute position sensor or by manual input.

The monitoring device 20 then employs the travel sensor 24 for determining whether the elevator car 10 is moving (step 210), and for measuring the travel time $\Delta t_k$ of a detected movement of the elevator car 10 in step 220. Optionally, this may further include determining the direction of the respective movement of the elevator car 10.

From the measured travel time $\Delta t_k$, the travel distance $s_k$ of the respective movement is then determined by selecting the pair of travel time and travel distance $(\Delta t_k, s_k)$ from the travel time profile 34 (see FIG. 7), which is been stored in memory 28 during the calibration 100, corresponding to the measured travel time $\Delta t_k$ (step 230).

In this context, "corresponding to the measured travel time $\Delta t_k$" is to be understood as selecting the pair of travel time and travel distance $(\Delta t_k, s_k)$ from the travel time profile 34 for which the absolute value of the difference between the measured travel time $\Delta t_k$ of the respective movement and the travel time of the selected pair of travel time and travel distance $(\Delta t_k, s_k)$ is minimized and/or is below a predefined limit.

In case the starting position $z_k$ of the elevator car 10 is known, the evaluation of the travel time profile 34 may be restricted to the entries in (the row of) the matrix 35 of the travel time profile 34 corresponding to the known starting position $z_k$. In doing so, the computational effort and in consequence the electrical energy needed for determining the travel distance $s_k$ of the respective movement may be reduced even further.

The stopping position $z'_k$ of the respective movement may be determined from the known starting position $z_k$, the direction of the movement and the determined travel distance $s_k$. Said stopping position may be set as the new starting position $z_k+1$ for the next movement (step 240).

The positions $z_k$ and travel distances $s_k$ of the elevator car 10, which have been determined by the described the operation 200 of a monitoring device 20 may be used for further evaluation and analyses, e.g. for implementing predictive maintenance, has it as been described before.

The travel distance $s_k$ may be specified in standard length units such as inch, feet, meters or centimeters. As the rows and columns of the matrix 35 of the travel profile 34 represent the different floors 8*a*, 8*b*, 8*c* of the elevator system 2, the distance the elevator car 10 has traveled also may be specified by the number of floors 8*a*, 8*b*, 8*c* the elevator car 10 has passed during the detected travel time $\Delta t_k$.

Exemplary embodiments of the invention provide a monitoring device and methods for calibrating and operating a monitoring device which allow monitoring the operation of an elevator system consuming less energy since the time-consuming integration of detected accelerations is restricted to an initial calibration of the monitoring device. As result, the operation of an elevator system may be monitored with an autonomous monitoring system comprising its own power supply over a long period of time.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention shall not be limited to the particular embodiment disclosed, but that the invention includes all embodiments falling within the scope of the dependent claims.

What is claimed is:

1. A method of calibrating a monitoring device (20) for monitoring movement of an elevator car (10) of an elevator system (2) configured for traveling between a plurality of floors (8*a*, 8*b*, 8*c*), wherein the method comprises:

- detecting a travel time ($\Delta t_k$) between a starting time ($t_k$) and a stopping time ($t'_k$) as well as acceleration (a(t)) of elevator car (10);
- determining a velocity (v (t)) of the elevator car (10) by integrating the detected acceleration (a(t)) with respect to the detected travel time ($\Delta t_k$);
- determining a travel distance of the elevator car (10) by integrating the determined velocity (v(t)) with respect to the detected travel time ($\Delta t_k$);
- correlating the determined travel distance ($s_k$) with the detected travel time ($\Delta t_k$) to form a pair of travel time and travel distance;
- storing the pair of travel time and travel distance ($\Delta t_k$,$s_k$) as part of a travel profile (34); and
- determining a position of at least one door (12) of the elevator car (10) and setting the velocity (v(t)) of the elevator car (10) to zero any time the at least one door (12) is determined as not being completely closed.

2. The method according to claim 1, wherein the method further includes correlating the determined travel time ($\Delta t_k$) with a pair of floors (8*a*, 8*b*, 8*c*) including a starting floor (8*a*, 8*b*, 8*c*) and a stopping floor (8*a*, 8*b*, 8*c*) of the elevator car (10).

3. The method according to claim 1, wherein the method further includes

- determining a position ($z_k$, $z'_k$) of the elevator car (10) at the starting time ($t_k$) and/or at the stopping time ($t'_k$), and
- storing the determined position ($z_k$, $z'_k$) together with the pair of travel time and travel distance ($\Delta t_k$, $s_k$).

4. The method according to claim 1, wherein the method includes moving the elevator car (10) between all pairs of floors (8*a*, 8*b*, 8*c*) of the elevator system (2) and determining and storing the travel times ($\Delta t_k$) and travel distances ($s_k$) for every pair of floors (8*a*, 8*b*, 8*c*).

5. A method of determining a travel distance of an elevator car (10) of an elevator system (2), the method comprising:

- determining that the elevator car (10) is moving;
- determining a travel time ($\Delta t_k$) of the elevator car (10); and
- determining the travel distance ($s_k$) of the elevator car (10) and/or the number of floors (8*a*, 8*b*, 8*c*) the elevator car (10) has passed based on the travel time ($\Delta t_k$) in combination with a travel profile (34) generated by the method according to claim 1.

6. The method according to claim 5, wherein the method includes summing up the absolute values of the determined travel distances ($s_k$) of the elevator car (10) and/or the number of floors (8*a*, 8*b*, 8*c*) the elevator car (10) has passed over a plurality of movements of the elevator car (10) thereby generating a total travel distance ($s_{total}$) of the elevator car (10).

7. A method of determining a position of an elevator car (10) of an elevator system (2), wherein the method comprises:

- determining a starting position ($z_k$) of the elevator car (10);
- determining a direction of movement of the elevator car (10);
- determining a travel distance ($s_k$) of the elevator car (10) and/or the number of floors (8*a*, 8*b*, 8*c*) the elevator car (10) has passed employing the method according to claim 4;
- determining a current position ($z_{k+1}$) of the elevator car (10) by adding or subtracting the determined travel distance ($s_k$) and/or the number of floors (8*a*, 8*b*, 8*c*) the elevator car (10) has passed to/from the starting position ($z_k$);
- wherein the method includes setting the current position ($z_{k+1}$) of the elevator car (10) as a new starting position, after the movement of the elevator car (10) has been stopped.

8. A monitoring device (20) for monitoring movement of an elevator car (10) of an elevator system (2) configured for traveling between a plurality of floors (8*a*, 8*b*, 8*c*), wherein the monitoring device (20) comprises:

- a travel sensor (24) including an acceleration sensor (22) configured for detecting acceleration (a(t)) of the elevator car (10) and providing a corresponding acceleration signal;
- a memory (28); and
- a controller (26) configured for
  - determining a travel time ($\Delta t_k$) of the elevator car (10) and generating a corresponding travel time signal;
  - determining a velocity (v(t) of the elevator car (10) by integrating the detected acceleration (a(t) with respect to the detected travel time ($\Delta t_k$);
  - determining a travel distance ($s_k$) of the elevator car (10) by integrating the determined velocity (v(t)) with respect to the detected travel time ($\Delta t_k$);
  - correlating the determined travel distance ($s_k$) with the detected travel time ($\Delta t_k$) forming a pair of travel time and travel distance ($\Delta t_k$, $s_k$);
  - storing the pair of travel time and travel distance ($\Delta t_k$, $s_k$) as part of a travel profile (34) in the memory (28);

determining the position of at least one door (12) of the elevator car (10) and setting the velocity (v (t)) of the elevator car (10) to zero any time the at least one door (12) is determined as not being completely closed.

9. The monitoring device (20) according to claim 8, wherein the controller (26) is further configured for correlating the determined travel time ($\Delta t_k$) with a pair of floors (8*a*, 8*b*, 8*c*) including a starting floor (8*a*, 8*b*, 8*c*) and a stopping floor (8*a*, 8*b*, 8*c*) of the elevator car (10).

10. The monitoring device (20) according to claim 8, wherein the controller (26) is further configured for:

receiving a travel time signal from the travel sensor (24); and determining the travel distance ($s_k$) of the elevator car (10) and/or the number of floors (8*a*, 8*b*, 8*c*) the elevator car (10) has passed based on the travel time signal ($\Delta t_k$) in combination with the travel profile (34) stored in the memory (28).

11. The monitoring device (20) according to any claim 8, wherein the monitoring device (20) further configured for:

determining a starting position ($z_k$) of the elevator car (10), and storing the pair of travel time and travel distance ($\Delta t_k$,$s_k$) together with the starting position ($z_k$).

12. A monitoring device (20) for monitoring movement of an elevator car (10) of an elevator system (2) configured for traveling between a plurality of floors (8*a*, 8*b*, 8*c*), wherein the monitoring device (20) comprises:

a travel sensor (24) configured for detecting a travel time of the elevator car (10) and providing a corresponding travel time signal;

a memory (28) storing a travel profile (34) generated by a method according to claim 1, wherein the travel profile (34) comprises a plurality of pairs of travel time and travel distance ($\Delta t_k$, $s_k$) respectively correlating a travel time ($\Delta t_k$) with a travel distance ($s_k$) of the elevator car (10) and/or with the number of floors (8*a*, 8*b*, 8*c*) the elevator car (10) has passed; and a controller (26) configured for:

receiving the travel time signal;

determining the travel distance ($s_k$) of the elevator car (10) and/or the number of floors (8*a*, 8*b*, 8*c*) the elevator car (10) has passed based on the travel time signal in combination with the travel profile (34) stored in the memory (28).

13. The monitoring device (20) according to claim 8, wherein the travel sensor (24) is configured for additionally detecting a travel direction of the elevator car (10) and providing a corresponding direction signal; and wherein the controller (26) is further configured for determining a starting position ($z_k$) of the elevator car (10); and determining a current position ($z'_{k+1}$) of the elevator car (10) by adding or subtracting the determined travel distance ($s_k$) of the elevator car (10) and/or the number of floors (8*a*, 8*b*, 8*c*) to/from the determined starting position ($z_k$) based on the direction signal.

14. An elevator system (2) comprising an elevator car (10) configured for traveling along a hoistway (4); and at least one monitoring device (20) according to claim 8, which is configured for monitoring the movement of the elevator car (10).

* * * * *